UNITED STATES PATENT OFFICE.

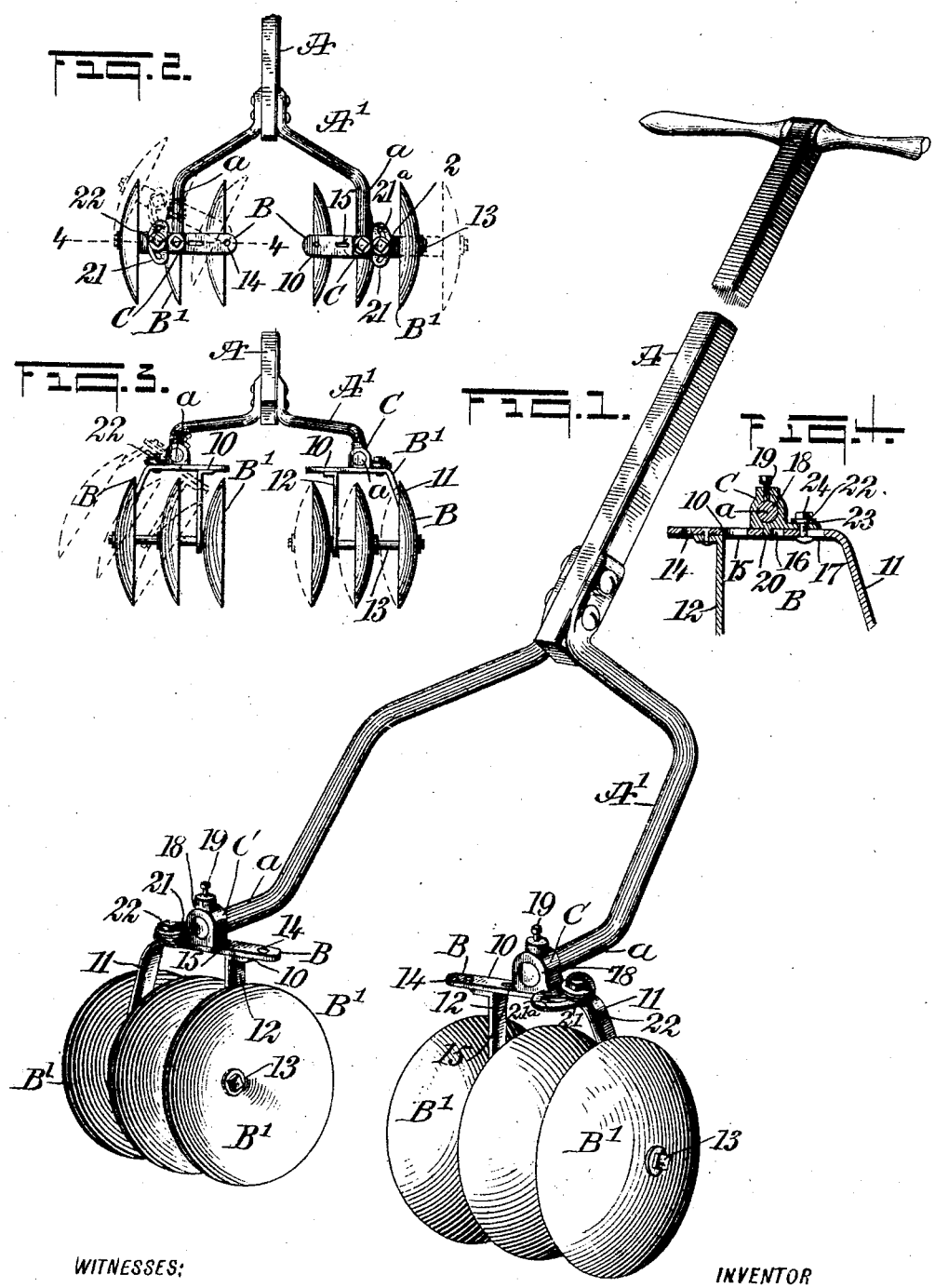

EDWARD B. WINTERS, OF COFFEYVILLE, KANSAS, ASSIGNOR TO COFFEYVILLE IMPLEMENT AND MANUFACTURING COMPANY, OF COFFEYVILLE, KANSAS.

CULTIVATOR.

No. 805,252.        Specification of Letters Patent.        Patented Nov. 21, 1905.

Application filed December 24, 1904. Serial No. 238,189.

*To all whom it may concern:*

Be it known that I, EDWARD B. WINTERS, a citizen of the United States, and a resident of Coffeyville, in the county of Montgomery and State of Kansas, have invented a new and Improved Cultivator, of which the following is a full, clear, and exact description.

My invention relates to hand or garden cultivators; and the purpose of the invention is to provide a simple implement having disk cutters which can be operated either by pushing or pulling and to provide such means for adjustment of the disk cutters that the implement may be quickly and conveniently adapted for the cultivation of plants on a reach of level ground or in a hollow and whereby further adjustment may be made to adapt the implement to wide or to narrow rows.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the machine. Fig. 2 is a plan view, drawn upon a smaller scale, illustrating in dotted lines the rearward, diagonal, and lateral adjustment of the cutters. Fig. 3 is a front elevation of the implement, illustrating in dotted lines the vertical and reversible adjustment of the cutters; and Fig. 4 is a vertical section through a carrying frame for the disk cutters, the section being taken practically on the line 4 4 of Fig. 2.

The main frame of the implement consists of a handle A and a fork A', which is carried downward and forward from the handle, the terminals $a$ of the fork being in substantially a horizontal position when the implement is in use. Each terminal $a$ of the fork A' is adapted to support and carry a frame B for disk cutters B'.

Each carrying-frame B consists of an upper horizontal member 10, a downward and outward inclined member 11, and an opposing downwardly-extending member 12, the said members 11 and 12 being apertured at their lower ends, in which apertures the ends of a shaft 13 are mounted to turn. Therefore the said members 11 and 12 are virtually hangers for the said shaft 13. The disk cutters B' in any desired number are secured to the shaft 13. Usually three cutters B' are employed in connection with each carrying-frame B, and said disk cutters have one face convexed and the other face concaved, as is illustrated. When three cutters are employed in connection with a carrying-frame B, one is secured to the shaft 13 at its center and the other two at the ends of the shaft outside of the hangers 11 and 12. Normally the concaved faces of the disk cutters are their inner faces.

The upper member 10 of each carrying-frame B is provided with openings, usually four in number—as, for example, a circular opening 14 near the inner end of the member 10 and three elongated openings (designated, respectively, as 15, 16, and 17) suitably spaced between the circular opening 14 and the outer end of the said frame member 10 or that end at which the inclined hanger 11 is located, as is shown in Fig. 4.

The connection between each carrying-frame B and a terminal $a$ of the fork A' is effected through the medium of an adjustable box C. Such box is provided with an opening 18, through which a terminal $a$ of the fork A' may freely pass, and a set-screw 19 is provided at the top of the box C, extending into the said opening 18, as is also shown in Fig. 4, while at the bottom of the box, which is usually flat, a lug 20 is formed, adapted to enter any one of the openings in the upper member 10 of a carrying-frame.

Each box C is provided with a horizontal side arm 21, located at its bottom, and said side arm has a segmental slot 21ª produced therein to receive a bolt 22, which in use is passed through the opening in the top member 10 of a carrying-frame next to that opening into which the lug 20 of the box C may be introduced. The bolt 22 at its threaded terminal is provided with a suitable washer 23 and a nut 24, and through the medium of the said bolt and lug the box C is adjustably secured to a carrying-frame B, and by means of the boxes C the carrying-frames B are adjustably connected with the fork A'. By adjusting the boxes C on the carrying-frames B the said frames may be brought close together or carried farther apart to accommodate the implement to rows of different width, as is shown at the right in Fig. 2, and through the medium of the slotted arms 21 of the boxes C the carrying-frames B can be given forward and rearward inclination, as is shown at the left in Fig. 2. By loosening the thumb-screws 19 of the boxes the carrying-frames B may be adjusted vertically on the fork A' or rearwardly adjusted, as is shown at the left in Figs. 2 and 3.

When the soil is to be thrown toward the plants, the concaved surfaces of the disks face inward, as is illustrated by positive lines in the drawings, and when it is desired to throw the dirt away from the plants the carrying-frames are reversed from their normal positions, thus causing the convexed surfaces of the disk cutters to face inward, as is shown by dotted lines at the right in Fig. 3. As the carrying-frames for the disks are independent one of the other, each frame can be separately adjusted to suit conditions.

The implement is exceedingly simple and, as has been stated, can be adjusted for use in connection with rows of varying widths and can be successfully employed upon any character of ground, and the implement is so light that it can be operated with but little fatigue on the part of the workman.

Having thus described my invention, I claim as new and desire to secure by Letters Patent—

1. In a hand-cultivator, a fork-shaped frame, boxes adjustably mounted on the terminals of said fork-shaped frame, carrying-frames having lateral adjustment on the boxes, cutters supported by said carrying-frames, and a connection between each box and a carrying-frame to permit of giving the latter a forward and rearward inclination.

2. In a hand-cultivator, a fork-shaped frame, boxes adjustably mounted on the terminal portions of the fork-shaped frame, the boxes being each provided with a lug at its bottom portion and with an arm at one side, carrying-frames provided with apertures to receive the lugs on the boxes, means for adjustably connecting the arms on the boxes with the carrying-frames, and shafts mounted to turn in the carrying-frames and provided with disk cutters.

3. In cultivators, a fork-shaped frame, boxes adjustably mounted on the terminal portions of the said fork-shaped frame, carrying-frames, an adjustable connection between each box and a carrying-frame, shafts mounted to revolve in the carrying-frames, and disk cutters secured to the said shafts.

4. In cultivators, a main frame, a box adjustably secured on the main frame, the said box being provided with a lug at its bottom portion and with a slotted arm at a side portion, a carrying-frame provided with a series of apertures, into any one of which said lug may enter, a bolt adapted to be passed through the slot in said arm and through one of the apertures in the carrying-frame, a shaft mounted to revolve in the carrying-frame, and disk cutters secured to said shaft.

5. In cultivators, a handle, a fork-shaped main frame secured to the handle, inclining downward and forward therefrom, the terminals of said forked frame being substantially horizontal when the implement is in use, carrying-frames, each carrying-frame being provided with a series of openings in its upper portion, a shaft mounted to revolve in the frame, and disk cutters on the shaft, boxes having openings to receive the terminals of the forked frame, set-screws carried by said boxes, engaging with the terminal portions of the forked frame, each box being provided with a lug at its bottom portion and each box being adapted to engage with the apertured portion of a carrying-frame, horizontal arms secured to the side portions of the said boxes, which arms are provided with segmental slots, and retaining devices passed through said slots in said arms and through certain of the apertures in the carrying-frames, as described.

6. In cultivators, a main frame, a box adjustably mounted on the main frame, the said box having a horizontal side arm provided with a segmental slot, a carrying-frame having lateral adjustment on the box, a bolt adapted to be passed through the segmental slot in said arm and through an aperture in said carrying-frame, and cutters supported by said carrying-frame.

In testimony whereof I have signed my name to this specification in the presence of two subscribing witnesses.

EDWARD B. WINTERS.

Witnesses:
  W. P. BROWN,
  S. LYNN.